United States Patent [19]

Iijima et al.

[11] 4,316,790
[45] Feb. 23, 1982

[54] CATION EXCHANGE MEMBRANES

[75] Inventors: Tokuzo Iijima, Kobe; Yasushi Samejima, Kakogawa; Kazuo Kishimoto; Takamichi Komabashiri, both of Takasago; Toshiji Kano, Kobe, all of Japan

[73] Assignee: Kanegafuchi Chemical Industry Company Limited, Osaka, Japan

[21] Appl. No.: 150,499

[22] Filed: May 16, 1980

[30] Foreign Application Priority Data

May 16, 1979 [JP] Japan ................................. 54-60884

[51] Int. Cl.³ ...................... C25B 13/02; C25B 13/08
[52] U.S. Cl. .................................. 204/296; 204/282; 204/283
[58] Field of Search ....................... 204/296, 282, 283

[56] References Cited

U.S. PATENT DOCUMENTS

| | | | |
|---|---|---|---|
| 4,024,043 | 5/1977 | Dege et al. | 204/296 |
| 4,083,768 | 4/1978 | Lee et al. | 204/296 |
| 4,100,113 | 7/1978 | McCain | 521/38 |
| 4,168,216 | 9/1979 | Burkhardt et al. | 204/98 |
| 4,169,023 | 9/1979 | Sata et al. | 204/98 |
| 4,183,793 | 1/1980 | Balko et al. | 204/98 |

*Primary Examiner*—F. Edmundson
*Attorney, Agent, or Firm*—Sughrue, Mion, Zinn, Macpeak and Seas

[57] ABSTRACT

A membrane for electrolyzing an alkali metal chloride solution using a finger type electrolytic cell equipped with a cation exchange membrane, wherein areas of said membrane not facing the effective electrolytic surface of the anode have a higher stiffness and a lower anion permeability than the areas of said membrane facing the effective electrolytic surface of the anode, thus reducing the alkali metal chloride content in the alkali metal hydroxide aqueous solution obtained from the cathodic chamber.

11 Claims, 12 Drawing Figures

CATION EXCHANGE MEMBRANES

BACKGROUND OF THE INVENTION

1. Field of the Invention

This invention relates to cation exchange membranes and more particularly to improved cylindrical cation exchange membranes for use in electrolysis of an aqueous alkali metal chloride solution in a finger type electrolytic cell.

2. Description of the Prior Art

The term "finger type electrolytic cell" as used herein includes an electrolytic cell of flattened tube-type construction as well as an electrolytic cell of finger type construction as described in J. S. Sconce, *CHLORINE—ITS MANUFACTURE, PROPERTIES AND USES*, Reinhold Publishing Corp., New York (1962), page 93, as, in more recent times, electrolytic cells of the flattened tube-type construction are also generally referred to as finger type electrolytic cells.

Cylindrically molded cation exchange membranes are suitable for fitting into the finger type electrolytic cells. However, cylindrically molded cation exchange membranes often provide electrolytic products having higher impurities (e.g., alkali metal chloride) than the products obtained from a filter press type electrolytic cell even if electrolysis is conducted by use of membranes with the same performance (i.e., the same properties of the membranes) and the same current density.

One of the reasons for this is that the areas of anode, membrane and cathode are nearly equal to each other in the filter press type electrolytic cell, whereas the area of membrane is larger than that of anode in the finger type electrolytic cell. Since the average current density of the membrane is lower than that of the anode, and low current density areas are present in localized areas of the membrane, and the concentration of alkali metal chloride in the alkali metal hydroxide formed is high.

Another reason is that the stiffness of the membrane is not sufficient, and it is difficult to effect the electrolysis while keeping the membrane in a flat or curved form. The membrane surface facing the effective electrolytic surface of anode can be kept with relative ease in a flat form. On the other hand, it is difficult to keep the membrane surface not facing the effective electrolytic surface of anode in a flat or curved form, and wrinkles are readily formed therein.

The expression "effective electrolytic surface of anode" as used herein refers to the total area of the anode which faces the cathode, the distance in a straight line from which to the cathode is short, and on which electrolysis materially occurs.

The wrinkles tending to form in the membrane facing the effective electrolytic surface of anode can be prevented by pressing the membrane against the cathode by use of an anode capable of being extended or an anode capable of being controlled with respect to the distance between the anode and cathode so that the anode, membrane and cathode are brought in intimate contact with each other.

However, at the membrane surfaces facing in directions in which the anode cannot be extended or controlled with respect to the distance (that is, those areas not facing the effective electrolytic surface of anode), it is usually difficult to hold the anode, membrane and cathode in an intimate contact state and therefore wrinkles are readily formed in these areas of the membrane surface. This leads to an undesirable situation wherein at the surface facing the anode chlorine gas is trapped or it is at least difficult for the chlorine gas to escape therefrom. This chlorine gas is converted to chlorine ions in a cathodic solution. Therefore, where cylindrically molded cation exchange membranes alone are used, the product obtained is sometimes inferior in quality to that wherein the same membrane is applied using a filter press type electrolytic cell.

Also, where the wrinkles are formed in the membrane surface facing the cathode, hydrogen gas is easily trapped, and it is difficult for the hydrogen gas to escape therefrom. Because of this gas gap, the cell voltage is increased.

SUMMARY OF THE INVENTION

This invention is intended to provide improved cylindrical cation exchange membranes which have removed the problems of the prior art membranes as described above.

This invention, therefore, provide a cylindrical cation exchange membrane in which the areas of the membrane not facing the effective electrolytic surface of anode has a greater stiffness and lower anion permeability than the areas of the membrane facing the effective electrolytic surface of the anode.

DETAILED DESCRIPTION OF THE INVENTION

Figure 1:
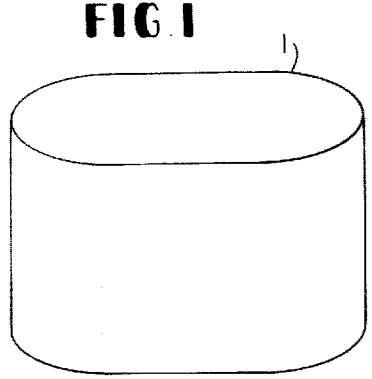
FIGS. 1 to 5 are perspective views of conventional cylindrical membranes.

In the cation exchange membranes of this invention, the stiffness of the areas not facing the effective electrolytic surface of the anode is greater than the stiffness of the areas facing the effective electrolytic surface of the anode, and the former areas have lower anion permeability. By the term "effective electrolytic surface" as herein used is meant the area where the current density is high.

The high stiffness produces the effects of preventing the formation of wrinkles in the membrane surface, of increasing the product quality, and of decreasing the cell voltage, and the anion non-permeability is further effective in improving the product quality.

For imparting such high stiffness and anion non-permeability, there can be employed a method in which two cation exchange membranes are superposed and bonded together. A second method is to use a fluorinated polymer film for the areas not facing the effective electrolytic surface of anode. According to a third method, the thickness of the membrane surface not facing the effective electrolytic surface of anode is made greater than those of the other areas. According to a fourth method, a fluorinated polymer is coated on the membrane surface not facing the effective electrolytic surface of the anode.

One of the cation exchange membranes which can be used in this invention is a fluorinated membrane having cation exchange sites, for example, a perfluorosulfonic acid-perfluorocarbon polymer membrane which is produced by E. I. Du Pont Co. under the trade name of Nafion.

The perfluorosulfonic acid-perfluorocarbon polymer membrane as used in the examples described below has the structure:

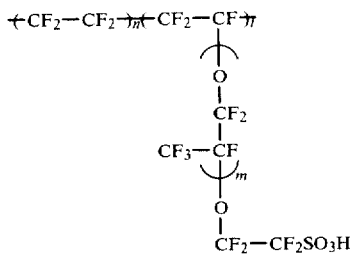

The concentration of ion exchange sites can be indicated by the weight of dry resin per equivalent of $SO_3^-$ ion exchange site, and is usually from about 1,100 to 1,500 g per equivalent of $SO_3^-$ ion exchange site.

In addition, cation exchange membranes having other weakly acidic exchange sites can be used; for example, such exchange sites may be formed from acidic groups such as carboxylic acid, phosphoric acid, sulfonamido and like groups singly or in admixtures comprising two or more thereof or in combination with sulfonic acid groups.

The use of a cation exchange membrane for use in the finger type electrolytic cell having a high equivalent weight in the areas thereof not facing the effective electrolytic surface of the anode permits the prevention of permeation of anions in those areas of the cylindrical membrane where the current density is low. In the electrolysis of alkali metal chloride, the permeating anion is $Cl^-$. The equivalent weight of the cation exchange membrane in the areas not facing the effective electrolytic surface of the anode should be sufficient to be greater than the equivalent weight (i.e., 1,000 to 1,800 g/eq) of the area facing the effective electrolytic surface, and it is preferably 2,000 g/eq or more.

Methods which can be used for producing cation exchange membranes having equivalent weights of 2,000 g/eq or more include: (1) a method in which sulfonyl groups of a sulfonic acid type cation exchange membrane having an equivalent weight of 1,100 to 1,500 are heated together with sulfonyl chloride to increase the equivalent weight; (2) a method in which radical initiators such as azobisisobutyronitrile act on sulfonyl chloride to increase the equivalent weight; and (3) a method in which sulfonyl-chlorinated membrane is hydrolyzed in the presence of acetone to increase the equivalent weight.

In bonding together the cation exchange membranes or the cation exchange membrane and the fluorinated polymer film, a perforated hydrophilic fluorinated polymer is interposed between them.

Examples of such perforated hydrophilic fluorinated polymer include polymers which are made hydrophilic by cation exchange groups, for example, Microporous Nafion produced by E. I. Du Pont Co., e.g., Nafion #101, #710, etc.

For making the fluorinated polymers hydrophilic, a method can be employed in which active sodium, e.g., sodium metal, sodium dispersion, stabilized sodium metal and the like is used. In addition, these fluorinated polymers can be made hydrophilic by surface active agents such as perfluorocarbon based surface active agents. Moreover, these fluorinated polymers made hydrophilic by use of titanium compounds such as potassium titanate and titanium dioxide can be used. In addition, these fluorinated polymers can be made hydrophilic by use of corona discharge.

Where perforated cation exchange membranes are used as hydrophilic fluorinated polymers, it is preferred to use microporous membranes having sulfonic acid or sulfonamido groups on at least one surface thereof. Such a membrane can be treated by the method described in Japanese patent application No. 49 394/79 and thereafter it is interposed between two fluorinated polymer materials in a sandwiched structure and mounted. Heat adhesion is carried at a temperature of from about 150° C. to 300° C. and pressure of from about 10 kg/cm² to 150 kg/cm².

Fluorinated polymers which can be used in this invention include homo- and copolymers of tetrafluoroethylene, trifluoropropylene and perfluoroalkyl vinyl ether. Fluorocarbon based cation exchange membranes can be used as fluorinated polymers, in the form of a film-like membrane or a membrane reinforced with a fabric of polytetrafluoroethylene.

The portion where the cation exchange membranes are bonded together is provided with stiffness and low permeability to anions. Since the fluorinated polymer film is usually lower in anion permeability than the cation exchange membrane, when the fluorinated polymer film is bonded together with the cation exchange membrane and arranged in such a manner that it does not face the effective electrolytic surface of anode, the cylindrical membrane obtained is provided with lower anion permeability in such areas. By properly choosing the thickness of the film, the membrane is provided with a higher stiffness than that of the cation exchange membrane.

Also, by varying the thickness of the cation exchange membrane so that the thickness of the membrane surface not facing the effective electrolytic surface of anode is greater than that of the other areas, the stiffness and lower anion permeability can be provided. A cylindrical membrane having selective areas where the thickness is greater than in the other areas can be produced by an extrusion molding process wherein the thickness of the membrane is varied for a desired length.

For production of such a membrane, there can be employed a method in which the membrane is extruded in a cylindrical form or a sheet-like membrane is bonded to give a cylindrical form. In addition, a method can be employed in which the cation exchange resin layer is coated on one or both sides of a nearly uniformly thick membrane. For this purpose, a method can be employed in which a solution of a cation exchange resin in a lower alkanol is coated and dried.

Methods to provide the membrane surface not facing the effective electrolytic surface of cathode with the stiffness and anion non-permeability by coating the fluorinated polymer thereon include a method of coating a dispersion of polytetrafluoroethylene and the like.

Figure 2:
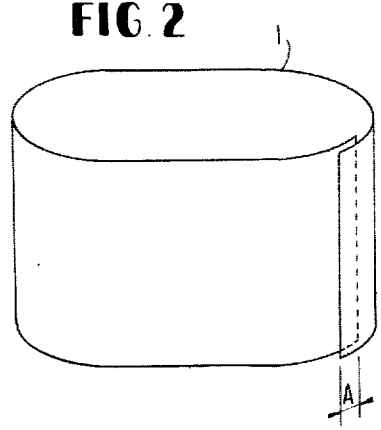
Figure 3:
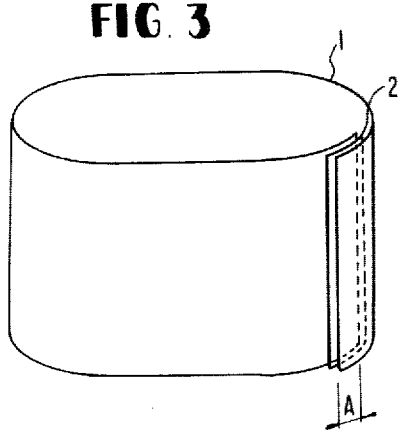
Figure 4:
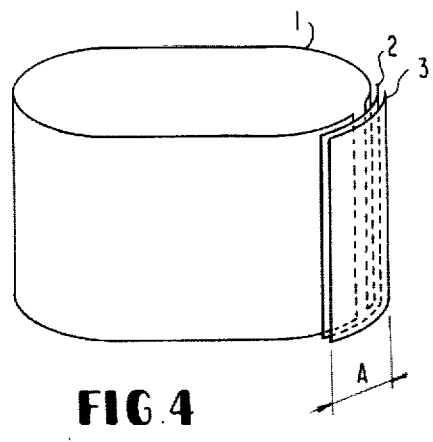
Figure 5:
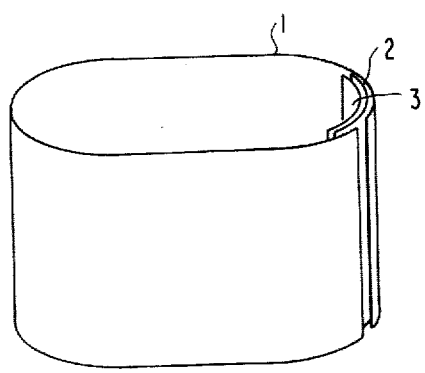

Conventional cylindrical membranes are as illustrated in FIGS. 1 to 5. FIG. 1 shows a cation exchange membrane molded in a cylindrical form by extrusion molding. FIG. 2 shows a cylindrical membrane produced by bonding a cation exchange membrane 1. FIG. 3 shows a cylindrical membrane produced by bonding a cation exchange membrane 1 with a perforated hydrophilic fluorinated polymer 2 interposed therebetween. FIGS. 4 and 5 show cylindrical membranes produced by use of a cation exchange membrane 3 as a patch to bind the ends of the cation exchange membrane with a perforated hydrophilic fluorinated polymer 2 interposed therebetween.

Figure 6:
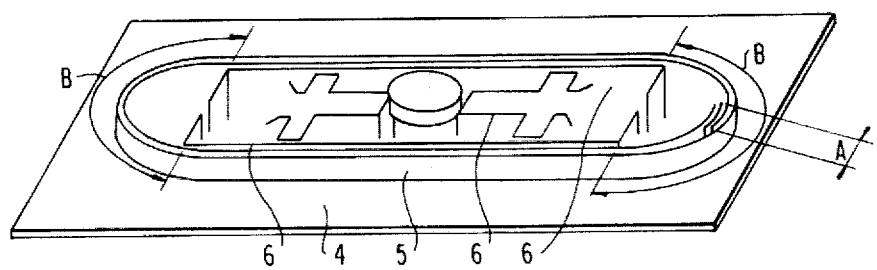
FIGS. 6, 8 and 10 are illustrative perspective views of a conventional cylindrical membrane as in FIG. 3 and membranes according to this invention as in FIGS. 7, and 9, respectively, which are mounted in a frame 4 for attachement of the cation exchange membrane in combination with the anode 6.

A cylindrical membrane of the type as illustrated in FIG. 3 can be mounted in a frame 4 for attachment of the cation exchange membrane as illustrated in FIG. 6. For this conventional cylindrical membrane, the length (A) of the bonded portion is shorter than the length (B) of the areas of a collar part 5, not facing the effective electrolytic surface of the anode. Therefore, in an area corresponding to the length of 2B-A, the anion nonpermeability is not sufficient. Typically A is less than ⅓ of B.

Figure 7:
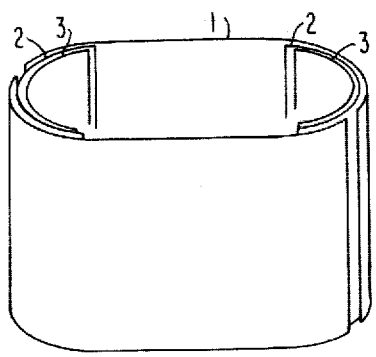
FIGS. 7, 9 and 11 are illustrative perspective views of cation exchange membranes according to this invention.

An embodiment of the cylindrical membranes of this invention is illustrated in FIG. 7 wherein 1 is a cation exchange membrane, 2 is a perforated hydrophilic fluorinated polymer, and 3 is a cation exchange membrane having a lower anion permeability than the cation exchange membrane 1. The material constituting the cation exchange membrane 3 may be the same as or different from that of the cation exchange membrane 1. For example, the cation exchange membrane 1 can be a carboxylic acid type cation exchange membrane while the cation exchange membrane 3 can be a sulfonic acid type cation exchange membrane.

Figure 8:
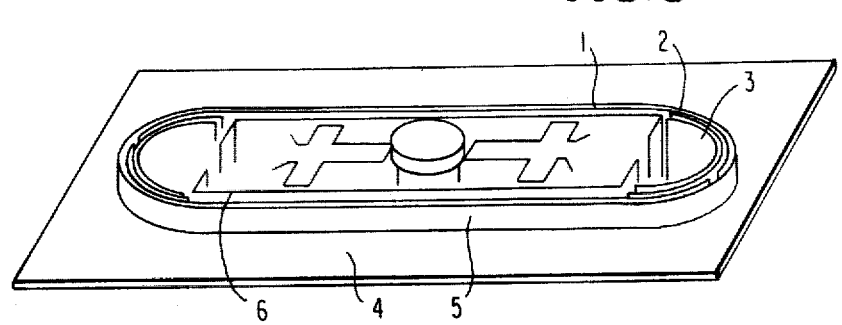

The cylindrical membrane of FIG. 7 can be mounted as illustrated in FIG. 8 wherein 4 is a frame for attachement of the cation exchange membrane which is placed on the surface of the cathode, 5 is a collar portion of frame 4, and 6 is an anode.

Figure 9:
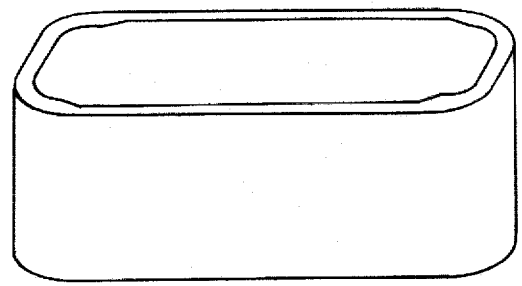

FIG. 9 shows a cation exchange membrane in which the thickness of the area not facing the effective electrolytic surface of the anode is greater than that of the other areas and which is produced by extrusion molding. As in the case of the bonded membrane as illustrated in FIG. 7, this membrane is mounted in a frame 4 for attachment of cation exchange membrane as illustrated in FIG. 10 and used.

Figure 11:
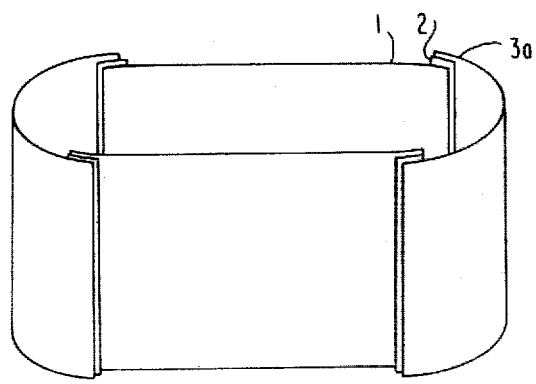

FIG. 11 shows a cylindrical membrane according to the invention in which a fluorinated polymer film 3a is used for the areas not facing the effective electrolytic surface of anode, and the fluorinated polymer film 3a and a cation exchange membrane 1 are bonded together with a perforated hydrophilic fluorinated polymer 2 interposed between them.

Figure 10:
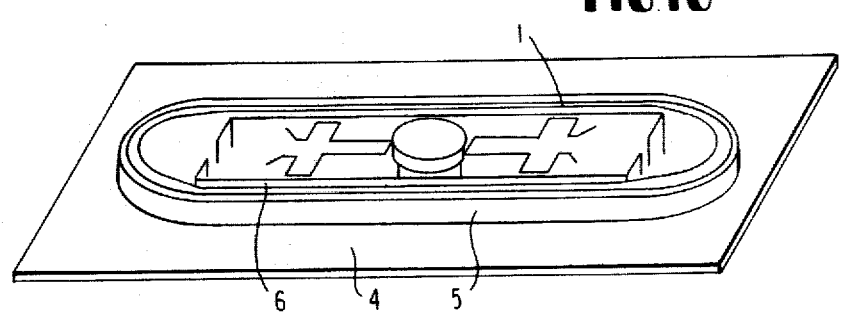
Figure 12:
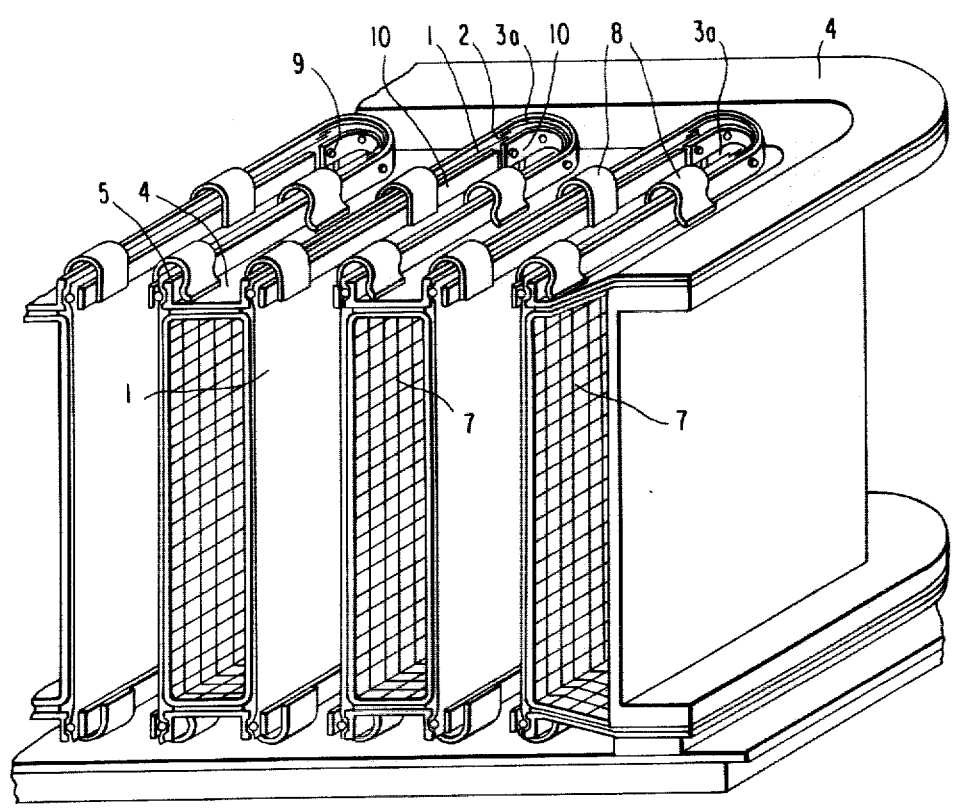
FIG. 12 is a perspective cross-sectional view of an electrolytic cell having a perpendicular section in which membranes having the shape of FIG. 11 are mounted as illustrated in FIG. 8 or FIG. 10.

FIG. 12 shows a perspective cross-sectional view of an electrolytic cell in which membranes having the shape as illustrated in FIG. 11 are mounted as shown in FIGS. 8 and 10, wherein 1 is a cation exchange membrane, 2 is a perforated hydrophilic fluorinated polymer, 3a is a fluorinated polymer film, 4 is a frame for attachment of the cation exchange membrane, 5 is a collar part of the frame 4, 7 is the cathode, 8 is a grip, 9 is a bolt and nut assembly, and 10 is a supporting plate.

The following examples and comparative examples are given to illustrate this invention in greater detail. Unless otherwise indicated herein, all parts, percents, ratios and the like are by weight.

EXAMPLE 1

As cation exchange membranes (see 1 and 3 of FIG. 7), Nafion #315 produced by E. I. Du Pont Co. was used and as a perforated hydrophilic fluorinated polymer (2 of FIG. 7) Nafion #701 was used. The portion of each membrane to be bonded together was dipped in a methanol/water (1/1 by weight) solution containing 0.2 mol/l of ammonium tetrabutyl hydride for 1 hour, dried and then hot pressed for 5 minutes at 250° C. and 75 kg/cm² to provide a cylindrical membrane as illustrated in FIG. 7.

This cylindrical membrane was mounted in a titanium frame 4 for attachment of cation exchange membrane. A finger type electrolytic cell of a current area of 85.1 dm² with Expandable DSE (i.e., Dimensionally Stable Electrode) as anode and a perforated metal as cathode was employed.

3 N brine (i.e., an alkali metal chloride solution) was supplied to an anodic chamber, from which was withdrawn 2 N brine to control the concentration of caustic soda in a cathodic chamber to 20% by weight. A current was passed to give a current density of 25 A/dm². The temperature of the electrolytic cell is 89° C. and the cell voltage was 3.45 V.

The concentration of caustic soda in the effluent from the cathodic chamber was 19.2% by weight and the concentration of sodium chloride was 29 ppm. Calculated on a basis corresponding to a concentration of caustic soda of 50% by weight, the concentration of sodium chloride would be 76 ppm.

EXAMPLE 2

An ethylenediamine processed membrane, Nafion #415 produced by E. I. Du Pont Co., Nafion #701 and Nafion #315 were used as a cation exchange membrane (1 of FIG. 7), a perforated hydrophilic fluorinated polymer (2 of FIG. 7) and a cation exchange member (3 of FIG. 7), respectively. These memberes were hot pressed in the same manner as in Example 1 to obtain a cylindrical membrane as illustrated in FIG. 7. A current was passed through the cylindrical membrane in the same manner as in Example 1 except that 5 N brine was supplied to the anodic chamber and the decomposition ratio of the salt was 45%.

The electrolytic voltage was 3.45 V at a cell temperature of 87° C.

The concentration of caustic soda in the effluent from the cathodic chamber was 27.6% and the concentration of sodium chloride was 52 ppm. Calculated on a basis corresponding to a concentration of caustic soda is 50%, the concentration of sodium chloride would be 94 ppm.

EXAMPLE 3

A sulfonic acid type cation exchange membrane, Nafion #417 was dipped in a 10% aqueous solution of allylamine for 2 hours and dried. Thereafter, only one surface of the membrane was brought in contact with a 1:1 mixture of phosphorous pentachloride and phosphorous oxychloride and reacted at 120° C. for 10 hours to provide a 15μ thick sulfonylchloride layer only on one surface thereof.

The above membrane was dipped in a 4-bromo-1,1,2-trichlorobutene-1 solution saturated with azobisisobutyronitrile and reacted at 75° C. for 20 hours. It was then hydrolyzed by dipping it in a mixed (1:1) solution of a 20% sodium hydroxide aqueous solution and methanol at 80° C. for 16 hours and subsequently oxidized by dipping in a 20% sodium hydroxide aqueous solution saturated with potassium permanganate at 80° C. for 16 hours.

Surface infrared (Attenuated Total Reflection) analysis of the one surface showed a large peak to be assigned attributable to the fluorine-based carboxylic acid at 1,780 cm$^{-1}$. The thickness of the carboxylic acid type cation exchange layer was 15μ.

The thus-obtained membrane having the carboxylic acid layer on one surface thereof was used as a cation exchange membrane 1 of FIG. 7. A current was passed in the same manner as in Example 2. The temperature of the anodic chamber was 85° C. and the voltage was 3.55 V.

The concentration of caustic soda in the effluent from the cathodic chamber was 30.2% and the concentration of sodium chloride was 68 ppm. Calculated on a basis corresponding to a concentration of caustic soda of 50%, the concentration of sodium chloride would be 113 ppm.

COMPARATIVE EXAMPLE 1

A cylindrical membrane having the shape as illustrated in FIG. 4 was produced using the same sulfonic acid type cation exchange membrane as used in Example 1. By use of this membrane, a sodium chloride aqueous solution was electrolyzed in the same manner as in Example 1. The temperature of the anodic chamber was 90° C. and the cell voltage was 3.51 V.

The concentration of caustic soda in the effluent from the cathodic chamber was 20.1% and the concentration of sodium chloride was 47 ppm. Calculated on a basis corresponding to a concentration of caustic soda of 50%, the concentration of sodium chloride would be 117 ppm.

COMPARATIVE EXAMPLE 2

A cylindrical membrane having the shape as illustrated in FIG. 5 was produced by using the same ethylenediamine-processed membrane as used in Example 2. A sodium chloride aqueous solution was electrolyzed in the same manner as in Example 2. The temperature of the anodic chamber was 89° C. and the cell voltage was 3.56 V.

The concentration of caustic soda in the effluent from the cathodic chamber was 27.8% and the concentration of sodium chloride was 80 ppm. Calculated on a basis corresponding to a concentration of caustic soda of 50%, the concentration of sodium chloride would be 144 ppm.

COMPARATIVE EXAMPLE 3

A cylindrical membrane having the shape as illustrated in FIG. 5 was produced by using the same membrane as used in Example 3, said membrane having a carboxylic acid layer on one surface thereof. A sodium chloride aqueous solution was electrolyzed in the same manner as in Example 3. The temperature of the anodic chamber was 88° C. and the cell voltage was 3.63 V.

The concentration of caustic soda in the effluent from the cathodic chamber was 27.9% and the concentration of sodium chloride was 113 ppm. Calculated on a basis corresponding to a concentration of caustic soda of 50%, the concentration of sodium chloride would be 203 ppm.

While the invention has been described in detail and with reference to specific embodiments thereof, it will be apparent to one skilled in the art that various changes and modifications can be made therein without departing from the spirit and scope thereof.

What is claimed is:

1. A cylindrical cation exchange membrane, by which a finger type electrolytic cell is separated into an anode compartment providing anodes and a cathode compartment providing cathodes, said membrane comprising:
   first portions facing effective electrolytic surface of said anodes and cathodes and
   second portions facing ineffective electrolytic surface of said anodes and cathodes, wherein said second portions have a higher stiffness and a lower anion permeability than the first portions.

2. A cylindrical cation exchange membrane as in claim 1, wherein said membrane is composed of a plurality of membranes which are superposed and bonded together to form the areas having a higher stiffness and a lower anion permeability.

3. A cylindrical cation exchange membrane as in claim 1, wherein a film of a fluorinated polymer is used for the areas not facing the effective electrolytic surface of the anode bonded to a cation exchange membrane for the areas facing the effective electrolytic surface of the anode, to form said cylindrical cation exchange membrane.

4. A cylindrical cation exchange membrane as in claim 2 or 3, wherein the bonding of the cation exchange membranes or the cation exchange membrane and the film of the fluorinated polymer is effected with a perforated hydrophilic fluorinated polymer interposed between them.

5. A cylindrical cation exchange membrane as in claim 1, wherein said membrane is composed of a single membrane and said second portions are rendered thicker than said first portions.

6. A cylindrical cation exchange membrane as in claim 1, wherein a fluorinated polymer is coated on the area of the membrane facing the ineffective electrolytic surface of the anode to provide a higher stiffness and a lower anion permeability thereto.

7. A cylindrical cation exchange membrane as in claim 1, 2, 3, 5 or 6, wherein the areas of said membrane facing the effective electrolytic surface of the anode is a carboxylic acid type cation exchange membrane.

8. A cylindrical cation exchange membrane as in claim 7, wherein the areas of the membrane facing the ineffective electrolytic surface of the anode comprise a sulfonic acid type cation exchange membrane.

9. A cylindrical cation exchange membrane as in claim 1, 2, 3, 5 or 6, wherein the areas of said membrane facing the effective electrolytic surface of the anode is a sulfonic acid type cation exchange membrane.

10. A cylindrical cation exchange membrane as in claim 1, wherein the equivalent weight of the areas of the membrane facing the ineffective electrolytic surface of the anode is greater than the equivalent weight of the areas of the membrane facing the effective electrolytic surface of anode.

11. A cylindrical cation exchange membrane as in claim 10, wherein the equivalent weight of the area facing the ineffective electrolytic surface of the anode is 2,000 g/eq or more.